United States Patent [19]
Mori

[11] 3,893,007
[45] July 1, 1975

[54] VEHICLE STARTER PROTECTIVE SYSTEM

[75] Inventor: Kazumasa Mori, Aichi, Japan

[73] Assignee: Nippondenso Co., Ltd., Kariya, Japan

[22] Filed: July 6, 1973

[21] Appl. No.: 377,033

[52] U.S. Cl. ............. 317/9 B; 290/37; 290/38; 123/102 R; 317/33 VR
[51] Int. Cl. ............. H02h 3/00; H02h 7/00
[58] Field of Search ........ 317/9 B, 19, 33 VR; 307/10 R, 10 BP; 123/102 R, 179 A, 148 F; 290/36, 37, 38

[56] References Cited
UNITED STATES PATENTS

| | | | |
|---|---|---|---|
| 3,076,098 | 1/1963 | Colvill et al. | 290/36 |
| 3,356,082 | 12/1967 | Jukes | 123/148 F |
| 3,476,949 | 11/1969 | Ballou | 123/179 A |
| 3,543,039 | 11/1970 | Mosier | 290/38 R |
| 3,546,530 | 12/1970 | Simonsen | 317/19 |
| 3,623,464 | 11/1971 | Patis | 123/102 |
| 3,629,597 | 12/1971 | Wiley | 290/37 |
| 3,702,407 | 11/1972 | Sharp | 123/102 |

*Primary Examiner*—J. D. Miller
*Assistant Examiner*—Patrick R. Salce
*Attorney, Agent, or Firm*—Cushman, Darby & Cushman

[57] ABSTRACT

A protective system for a vehicle starter is provided, which comprises a starter relay consisting of contacts provided between the terminal of a coil for actuating the main switch of a vehicle starter and a DC power supply and a coil for operating the contacts, whereby when the frequency of the AC voltage of an AC generator installed in a vehicle reaches a predetermined value, the contacts of the starter relay are caused to open to thereby control the operation of the starter. This vehicle starter protective system thus prevents any fluctuation in the engine revolutions even when the power supply voltage, for example, changes upon the disconnection of the starter and the system also performs its starter protective function with increased reliability and has a highly improved versatility.

2 Claims, 11 Drawing Figures

VEHICLE STARTER PROTECTIVE SYSTEM

BACKGROUND OF THE INVENTION

1. Field of the Invention

The present invention relates to protective systems for starters which start the engine of a vehicle.

2. Description of the Prior Art

In known protective systems of this type, the output voltage of an AC generator installed in a vehicle is detected to automatically stop the operation of the starter when the detected output voltage reaches the starter switch-off voltage, thereby preventing the starter from being reversely operated by the engine after it has been started, and also making the starter inoperative even when the starter switch is erroneously closed again after the engine has been started to thereby prevent reengagement of the starter pinion. A disadvantage of this type of protective system is that while the above-mentioned starter switch-off voltage must be selected lower than the output voltage of the AC generator at the idling speed of the engine, it is more often than not that such starter switch-off voltage fails to start the engine since the engine speed at that time will vary considerably due to variation of the power supply voltage or the like and moreover it is impossible to ensure satisfactory protection of the starter. Further, while a protective system wherein the engine revolutions for switching off the starter is detected from the pulses produced by the ignition circuit has been proposed, this system is also disadvantageous in that it cannot be used for starting Diesel engines and the like and thus it does not have satisfactory versatility.

SUMMARY OF THE INVENTION

It is the object of the present invention to provide a starter protective system wherein, in order to eliminate the above-mentioned deficiencies, the frequency of the AC voltage of an AC generator installed in a vehicle is detected to control the operation of a starter, whereby the engine revolutions are not caused to change due to variation of the power supply voltage or the like when the starter is switched off, thus ensuring a satisfactory starting of the engine as well as highly reliable starter protective function and high versatility.

In accordance with the present invention, there is thus provided a starter protective system which comprises a starter relay having contacts provided between the auxiliary terminal of a starter and a DC power supply and a coil for operating the contacts, and a frequency detecting circuit for receiving as its input the AC voltage of an AC generator installed in a vehicle to cause the starter relay contacts to open when the frequency of the received AC voltage exceeds a predetermined value. Thus, the starter protective system of this invention has a great advantage in that the number of revolutions of the engine at the time that the starter is switched off is not influenced by variation of the power supply voltage or the like and it is thus maintained constant at all times, thereby ensuring a satisfactory starting of the engine as well as the starter preventing function, i.e. the prevention of the engine from operating the starter reversely or the prevention of the reengagement of the starter pinion even when the starter switch is closed again when the engine is in operation. There is a further advantage in that in contrast to starter preventive systems of the type in which the engine revolutions for switching off the starter is detected from the ignition pulses, the starter protective system of this invention can also be applied to engines such as Diesel engines having no ignition circuit and it is thus highly versatile.

DESCRIPTION OF THE PREFERRED EMBODIMENTS

Figure 1:
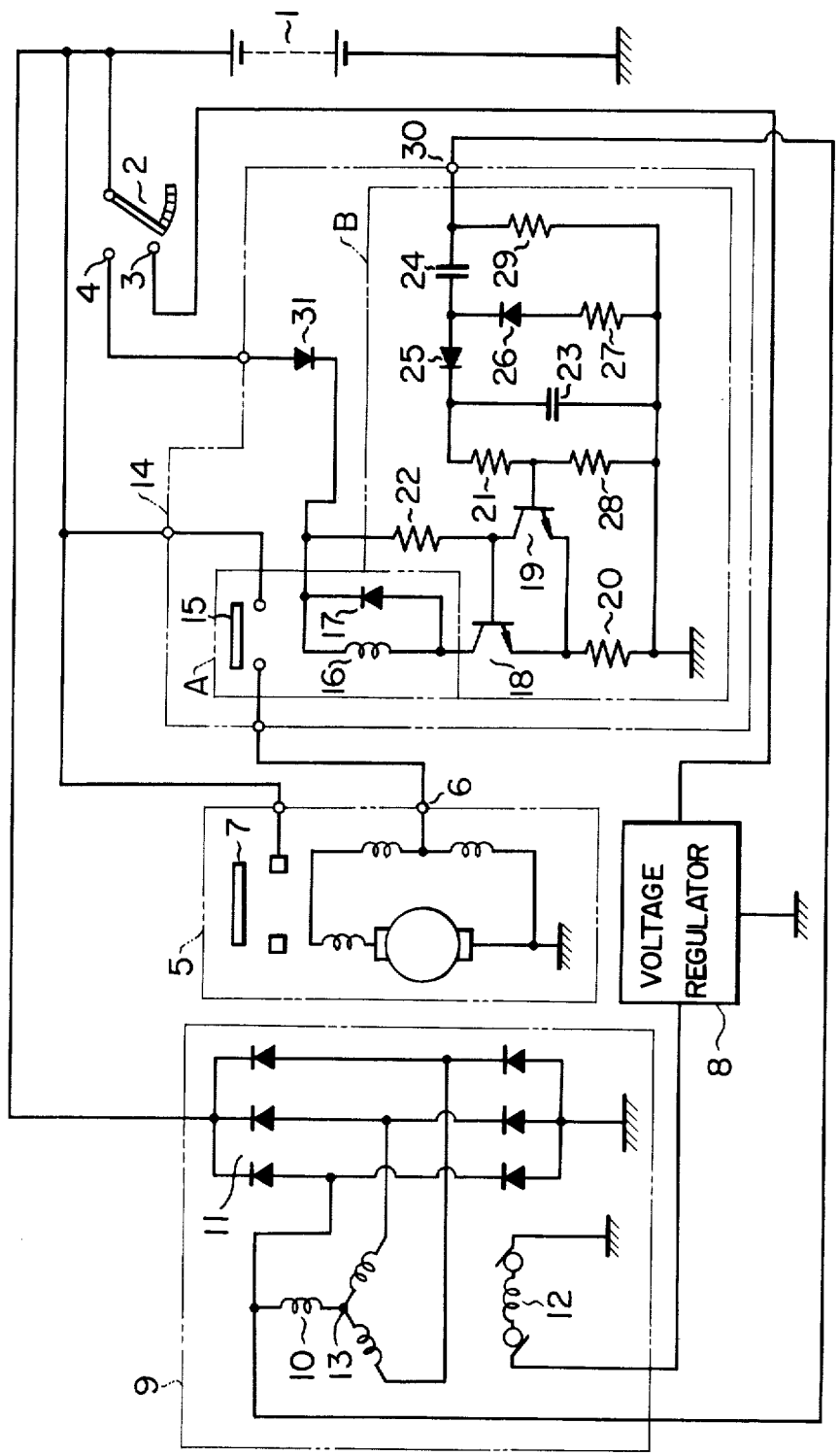
FIG. 1 is an electric circuit diagram showing the first embodiment of a vehicle starter protective system according to the present invention.

The present invention will now be explained with reference to the first embodiment shown in FIG. 1, in which numeral 1 designates a DC power supply comprising a battery installed in a vehicle, 2 a key switch comprising an ignition switch 3 and a starter switch 4. Numeral 5 designates a starter, 6 an auxiliary terminal of the starter, 7 starter main contacts, 8 a voltage regulator, 9 a generator installed in the vehicle, i.e. a three-phase AC generator, 10 armature windings, 11 rectifiers for rectifying the generated current of the armature winding, 12 a field winding, 13 a neutral point of the armature windings 10. The voltage regulator 8 is of known construction which controls the current flow in the field winding 12 to regulate the output voltage of the AC generator 9 at a predetermined value. Numeral 14 designates a starter protective system according to the present invention comprising a starter relay A consisting of normally open contacts 15, a coil 16 for operating the contacts 15 and a diode 17 for absorbing the counter electromotive force generated in the coil 16, and a frequency detecting circuit B consisting of an output stage transistor 18 for interrupting the energizing circuit for the coil 16, an input stage transistor 19, a common emitter resistor 20, a base resistor 21, a bias resistor 28, a load resistor 22, capacitors 23 and 24, diodes 25 and 26 and resistors 27 and 29, whereby the frequency detecting circuit B causes the starter relay contacts 15 to open when the frequency of the AC voltage of one phase of the AC generator 9 reaches a predetermined value. Of these component elements of the frequency detecting circuit B, the capacitor 23 and the base resistor 21 constitute delaying means for effecting a control so that the output stage transistor 18 remains in the off state for a fixed period after the extinction of the AC voltage. Numeral 31 designates a reverse current blocking diode for preventing the flow of reverse current to the starter preventive system 14 of the present invention.

With the arrangement described above, the first embodiment operates as follows. When the key switch 2 is thrown to the side of the ignition switch 3, an exciting current flows to the field winding 12 of the generator 9 through the voltage regulator 8, thereby causing the generator 9 to stand by. Then, when the key switch 2 is also thrown to the side of the starter switch 4 so that the base current is supplied to the output stage transistor 18 through the resistor 22 turning the transistor 18 on, the coil 16 is energized and thus the relay contacts 15 close. This supplies a current to the auxiliary terminal 6 of the starter 5, closing its main contacts 7 and thereby bringing the starter 5 into operation to start the engine rotating. The operation of the engine causes the generator 9 to come into operation, so that as a result of the charging and discharging action of the capacitor 24 by the AC voltage of one phase generated in the generator 9, the capacitor 23 is charged through the diode 25 and the charge stored in the capacitor 23 increases as the number of the charging and discharging actions per unit time of the capacitor 24 increases with increase in the frequency of the AC voltage or the number of revolutions of the engine. When the revolutions of the engine reach the starter switch-off revolutions, the voltage across the resistor 28 of the resistors 21 and 28 for dividing the voltage across the terminals of the capacitor 23 rises to a value sufficient to drive the transistor 19 into conduction and the transistor 19 is thus turned on. When this occurs, the output stage transistor 18 is turned off and the coil 16 of the starter relay A is deenergized, causing the contacts 15 to open and interrupting the energizing circuit for the starter 5. Consequently, the starter 5 is automatically stopped and thus the starter pinion is disengaged from the ring gear, thereby preventing the starter 5 from being operated reversely by the engine.

When the engine is running, the number of revolutions of the engine is always greater than the starter switch-off revolutions and consequently the starter relay A keeps the contacts 15 open by the action of the frequency detection circuit B. Accordingly, while the engine is running, even when the key switch 2 is thrown to the side of the starter switch 4 accidentally, the operation of the starter 5 and hence the engagement of the starter pinion will not take place thus preventing the so-called reengagement of the starter pinion.

On the other hand, if the key switch 2 is thrown to the starter switch 4 side immediately following the stopping of the engine operation, it is possible to prevent the operation of the starter 5 and hence the engagement of the stator pinion with the rotating ring gear by inertia as well as the engagement of the rotating pinion with the ring gear by inertia. The reason is that when the engine is running, the capacitor 23 in the frequency detecting circuit is charged to a voltage whose level corresponds to the then current revolutions of the engine. Thus, even when the engine stops rotating and hence the AC voltage of the generator 9 extinguishes, the stored charge on the capacitor 23 will be discharged into the base of the transistor 19 through the resistor 21, maintaining the transistor 19 in the on state for a predetermined time during which the output stage transistor 18 is cut off and therefore the contacts 15 of the starter relay A remain open. Of course, this predetermined time is dependent on the RC constant of the discharging circuit for the capacitor 23.

Further, if the DC power supply 1 is connected in the reverse direction or a reverse surge voltage is produced upon interruption of the inductive load such as the ignition coil, the reverse current blocking diode 31 prevents the flow of reverse current to the starter protective system 14 of the present invention thus protecting the protective system 14. Of course, the diode 31 may be connected between the protective system 14 and the negative terminal of the DC power supply 1.

In the embodiment discribed above, the transistors 18 and 19 in the frequency detecting circuit have the common emitter resistor 20 connected thereto thus constituting a so-called Schmitt circuit. Consequently, the hysteresis characteristic of this Schmitt circuit prevents chattering of the contacts 15 of the starter relay A and therefore there is no danger that the contacts 15 carrying large current may be caused to fuse and stick to each other by such chattering.

Furthermore, since, in the above-described embodiment, the contacts 15 of the starter relay A are directly connected to the power supply 1 and not through the starter switch 4 and since the protective system 14 of this invention is connected so that the power supply voltage is applied thereto through the starter switch 4, the large current that flows through the contacts 15 does not flow into the starter switch 4, but the small current that flows into the protective system 14 of the present invention flows through the starter switch 4 and this is a very great advantage from the standpoint of protection for the contacts of the starter switch 4.

Still furthermore, while, in the embodiment described above, the output voltage of one phase winding of the armature windings 10 is utilized as the AC voltage of the generator 9, the voltage at the neutral point 13 may also be utilized. Further, while, in this embodiment, the starter relay A includes the normally open contacts 15, the starter relay A may use contacts of the normally closed type, if the frequency detecting circuit B is constructed to use, for example, one or three transistors. Still further, the experiments conducted by the inventor showed that the 20-K$\Omega$ resistor 21, 80-$\mu$F capacitor 23 and 1-$\mu$F capacitor 24, the starter switch-off revolutions of 500 ± 30 (R.P.M) and the duration time of 3 seconds for the contacts 15 of the starter relay A to remain open after the stopping of the engine could be obtained.

Figure 2:
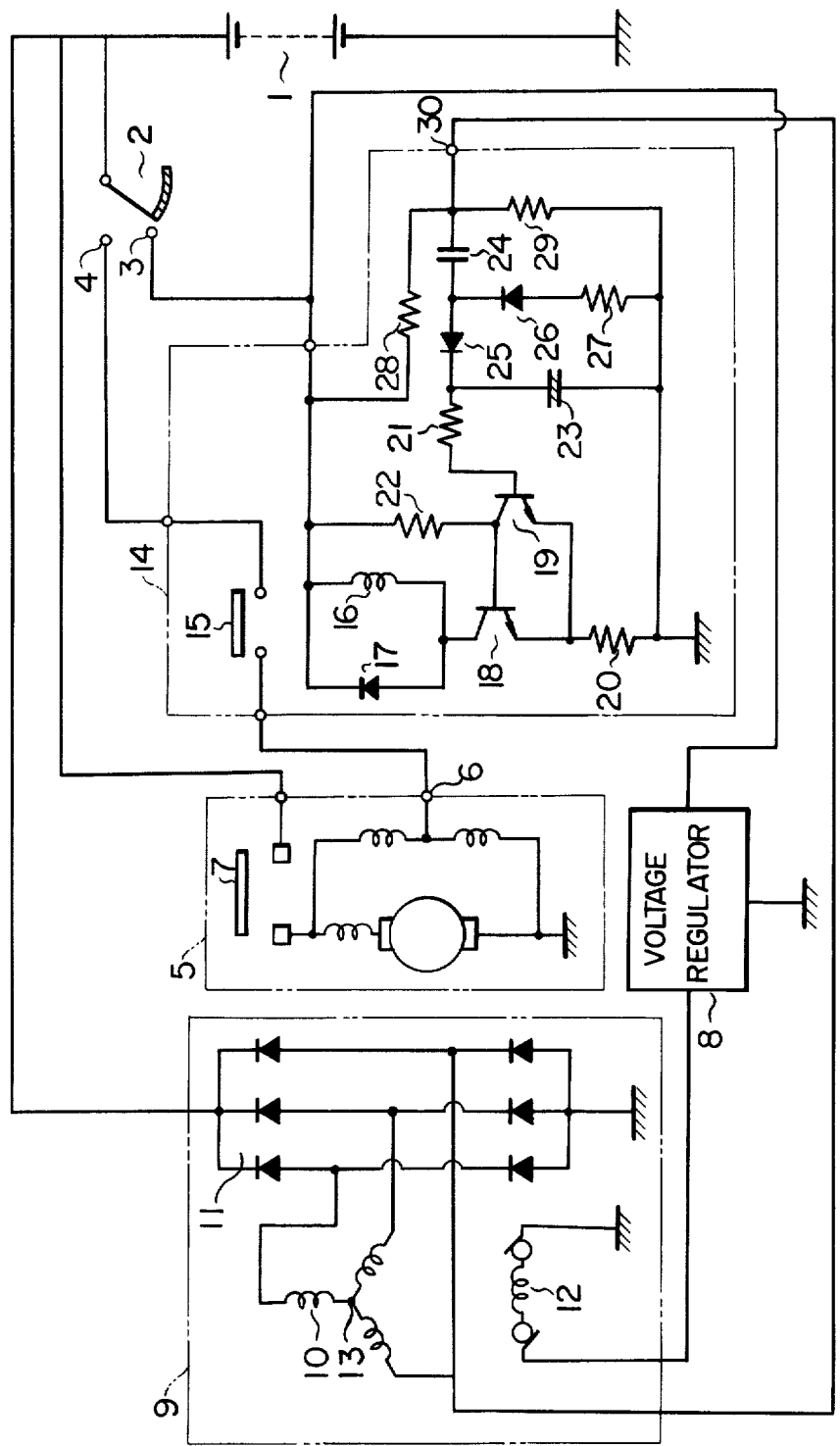
FIG. 2 is an electric circuit diagram showing the second embodiment of the system according to the present invention.

The second embodiment shown in FIG. 2 will now be expalined. The embodiment of FIG. 2 is identical with the first embodiment of FIG. 1, except that the contacts 15 of the starter relay are not directly connected to the power supply 1, but they are connected to the power supply 1 through the contact 4 of the starter switch, that the diode 31 of FIG. 1 is eliminated, that the common junction point of the coil 16, diode 17 and resistor 22 is connected to the contact 3 of the ignition switch and not to the contact 4 of the starter switch and that the resistor 28 is connected between a terminal 30 and the contact 3 of the ignition switch. In FIG. 2, the same reference numerals as used in FIG. 1 designate the identical parts.

With the arrangement described above, the second embodiment operates as follows. When the key switch 2 is thrown to the ignition switch 3 side, the exciting current flows to the field winding 12 of the generator 9 through the voltage regulator 8 causing the generator 9 to stand by. Consequently, the base current is supplied to the output stage transistor 18 through the resistor 22, with the result that the transistor 18 is turned on and thus the coil 16 is energized. This causes the relay contacts 15 to close and stay closed. Thereafter, when the key switch 2 is also thrown to the starter switch 4 side, a current is supplied to the auxiliary terminal 6 of the starter 5 through the contacts 15. This causes the main contacts 7 of the starter 5 to close, bringing the starter 5 into operation and thus starting the engine. The remaining operation of this embodiment is the same with that of the first embodiment of FIG. 1.

Figure 3:
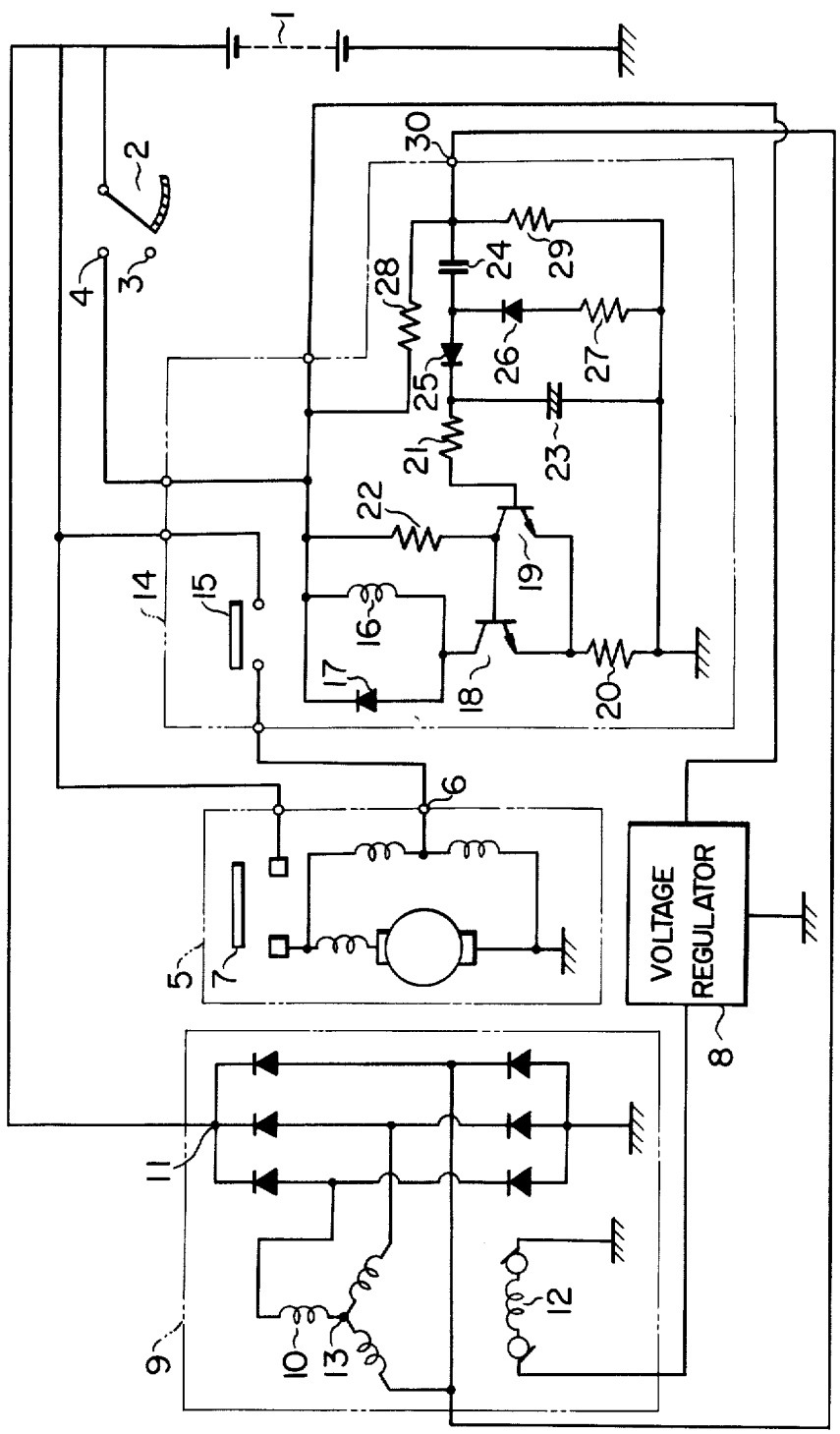
FIG. 3 is an electric circuit diagram showing the third embodiment of the system according to the present invention.

FIG. 3 shows the third embodiment of this invention. In this embodiment, as in the first embodiment, the contacts 15 of the starter relay are directly connected to the power supply 1 and not through the starter switch 4, and the protective system 14 of this invention is connected so that the power supply voltage is applied to the protective system 14 through the starter switch 4. The remaining construction of this embodiment is the same with the second embodiment. With this arrangement, closing the starter switch 4 turns on the output stage transistor 18, so that the contacts 15 of the starter relay close and the starter 5 is brought into operation to thereby start the engine. In this case, as in the first embodiment, there is a great advantage from the point of view of protecting the contact of the starter switch 4, since the large current that flows to the starter 5 does not flow to the starter switch 4, but only the small current that flows to the protective system 14 of this invention flows to the starter switch 4. Further, this embodiment performs, as the above-described first embodiment, the starter protective function that the starter is automatically switched off when the revolutions of the engine increase up to the starter switch-off revolutions.

Figure 4:
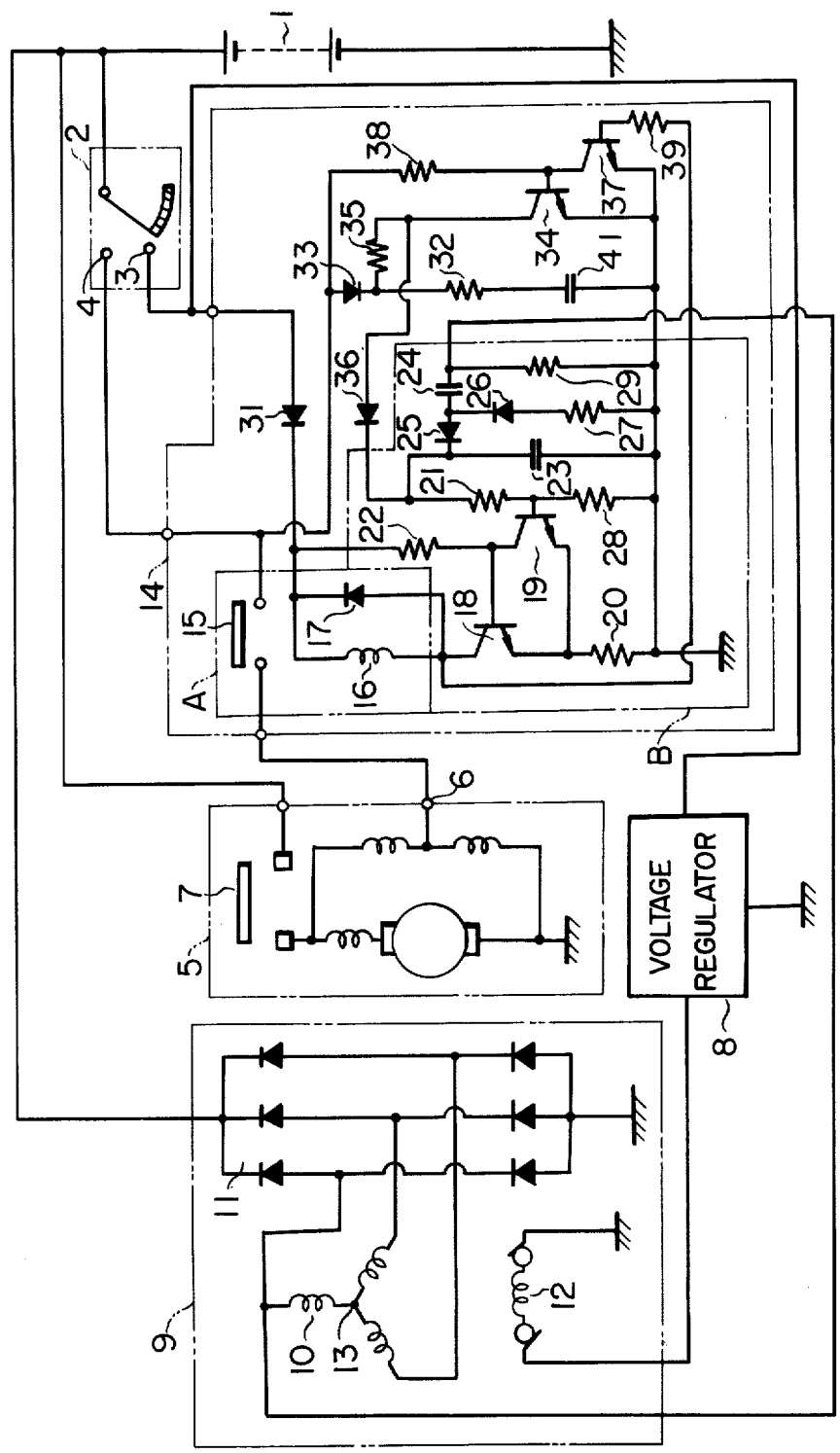
FIG. 4 is an electric circuit diagram showing the fourth embodiment of the system according to the present invention.

FIG. 4 shows the fourth embodiment of this invention. The fourth embodiment is identical with the first embodiment, except that a circuit comprising transistor 34 and 37 is further included. In this embodiment, numeral 31 designates a reverse current blocking diode for preventing the flow of reverse current to the starter protective system 14 of this invention. Numeral 32 designates a resistor, 33 a reverse current blocking diode, 41 a capacitor, the series circuit of these elements being connected between the starter switch 4 and the ground. The collector and emitter of the transistor 34 is connected in parallel with the series circuit of the capacitor 41 and the resistor 32 through a resistor 35, and the collector of the transistor 34 is connected to the top side of the base resistor 21 through a reverse current blocking diode 36. The collector and emitter of the transistor 37 are connected between the base and emitter of the transistor 34, while the collector of the transistor 37 is connected to the starter switch 4 through a load resistor 38 and its base is connected to the collector of the output stage transistor 18 through a base resistor 39.

With this arrangement, the operation of the fourth embodiment is the same with the first embodiment.

The purpose of the transistor 37 is such that when the key switch, once returned from the starter switch 4 to the ignition switch 3, is thrown to the starter switch 4 side again, the conducting transistor 34 is rendered nonconductive and it remains in this state until the capacitor 41 is completely discharged. In other words, the transistor 37 is rendered conductive when the starter switch 4 is closed (the ignition switch is also closed at this time) so that it receives the collector current from the power supply 1 through the starter switch 4 and the resistor 38 as well as the base current through the ignition switch 3, the diode 31, the relay coil 16 and the resistor 39, and the conduction of the transistor 37 causes the base of the transistor 34 to become substantially equal to the zero potential thus placing the transistor 34 in a nonconductive state.

Also, in the fourth embodiment described above, the contacts 15 of the starter relay A are connected to the power supply 1 through the starter switch 4 and the starter 5 is directly connected to the power supply 1, while the protective system 14 of this invention is arranged so that the power supply voltage is applied to the protective system 14 through the starter switch 4. Thus, there is a great advantage from the standpoint of protecting the contact of the starter switch 4, since the large current that flows to the starter 5 does not flow to the starter switch 4, but only the small current that flows to the protective system 14 of this invention flows to the starter switch 4.

Figure 5:
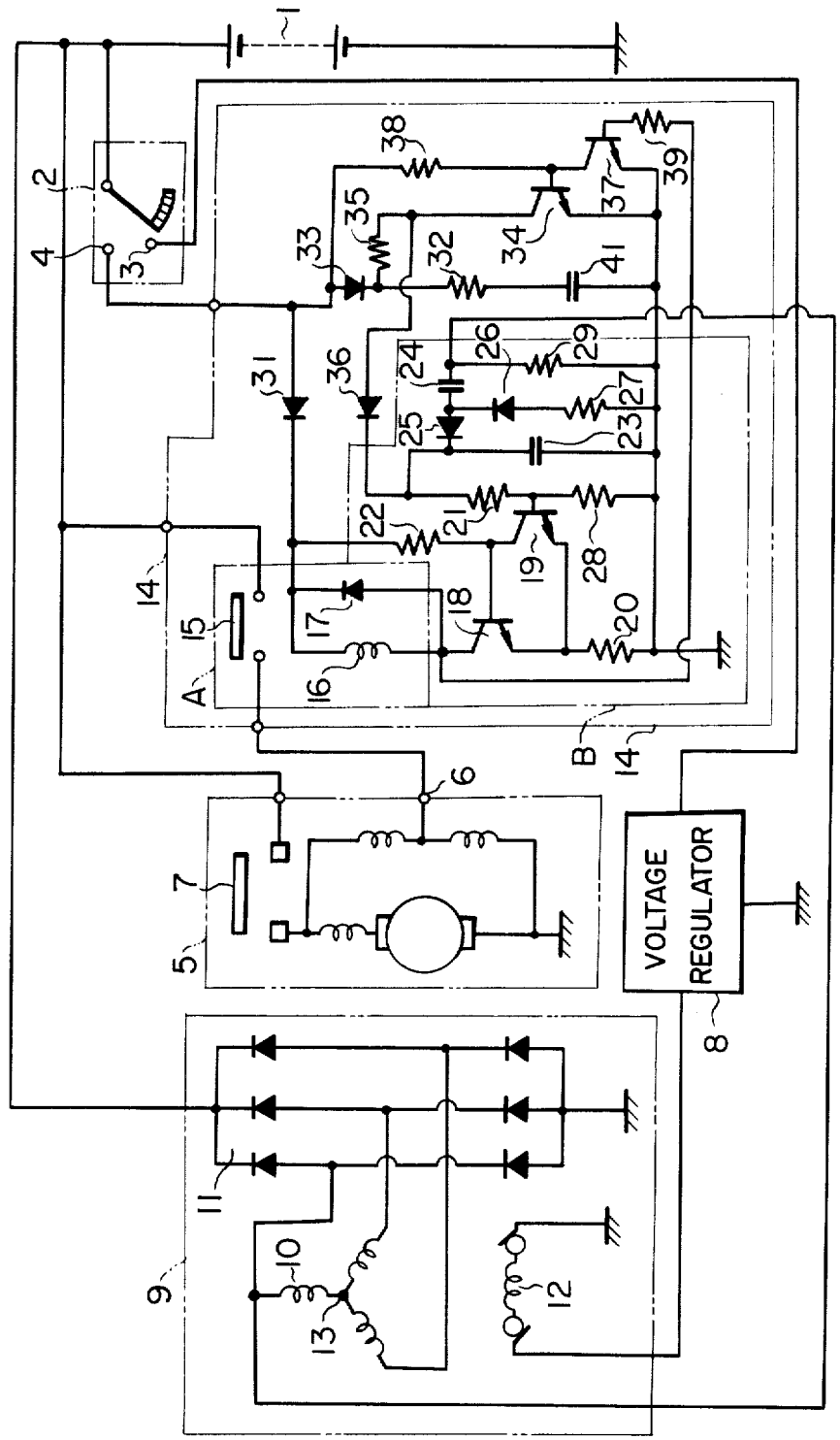
FIG. 5 is an electric circuit diagram showing the fifth embodiment of the system according to the present invention.

Further, while, in this fourth embodiment, the contacts 15 of the starter relay A are also connected to the power supply 1 through the starter switch 4, and one end of the coil 16 of the relay A and the resistor 22 are connected to the power supply 1 by way of the reverse current blocking diode 31 and the ignition switch 3, as shown in the fifth embodiment illustrated in FIG. 5, the contacts 15 may be directly connected to the power supply 1 and one end of the coil 16 and the resistor 22 may be connected to the power supply 1 through the starter switch 4.

Furthermore, while, in the fourth and fifth embodiments described above, the output voltage of one phase winding of the armature windings 10 is utilized as the AC voltage of the generator 9, the voltage at the neutral point 13 may be utilized equally.

Figure 6:
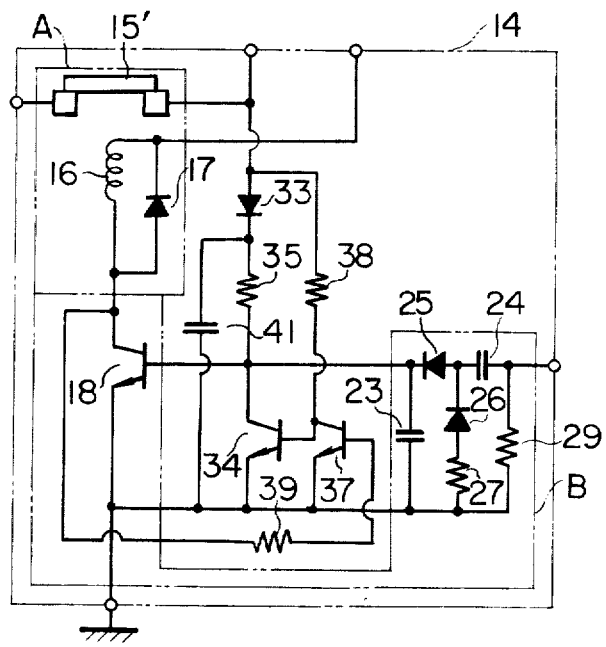
FIG. 6 is an electric wiring diagram showing the principal part of the sixth embodiment of the present invention.

Furthermore, while, in the fourth and fifth embodiments, the starter relay A is provided with the normally open contacts 15, as shown in the sixth embodiment illustrated in FIG. 6, the starter relay A may be provided with normally closed contacts 15', if the number of transistors in the frequency detecting circuit B of the starter protective system 14 is reduced to one. The same is true for other forms (not shown) of the frequency detecting circuit employing, for example, three transistors.

Figure 7:
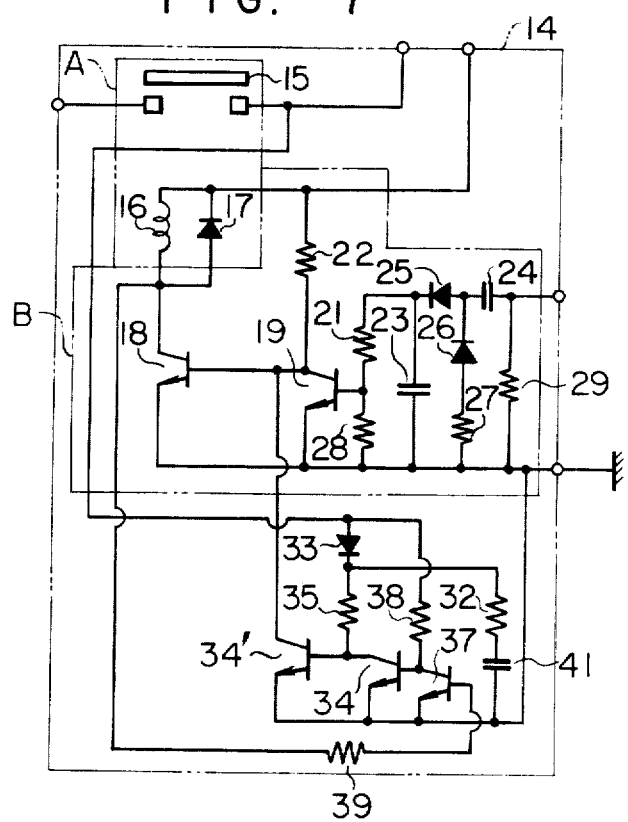
FIG. 7 is an electric wiring diagram showing the principal part of the seventh embodiment of the present invention.

The seventh embodiment shown in FIG. 7 further includes an additional transistor 34' which turns off and on the output transistor 18 of the frequency detecting circuit B. The operation of this seventh embodiment is, in principle, the same as the first embodiment shown in FIG. 1.

Figure 8:
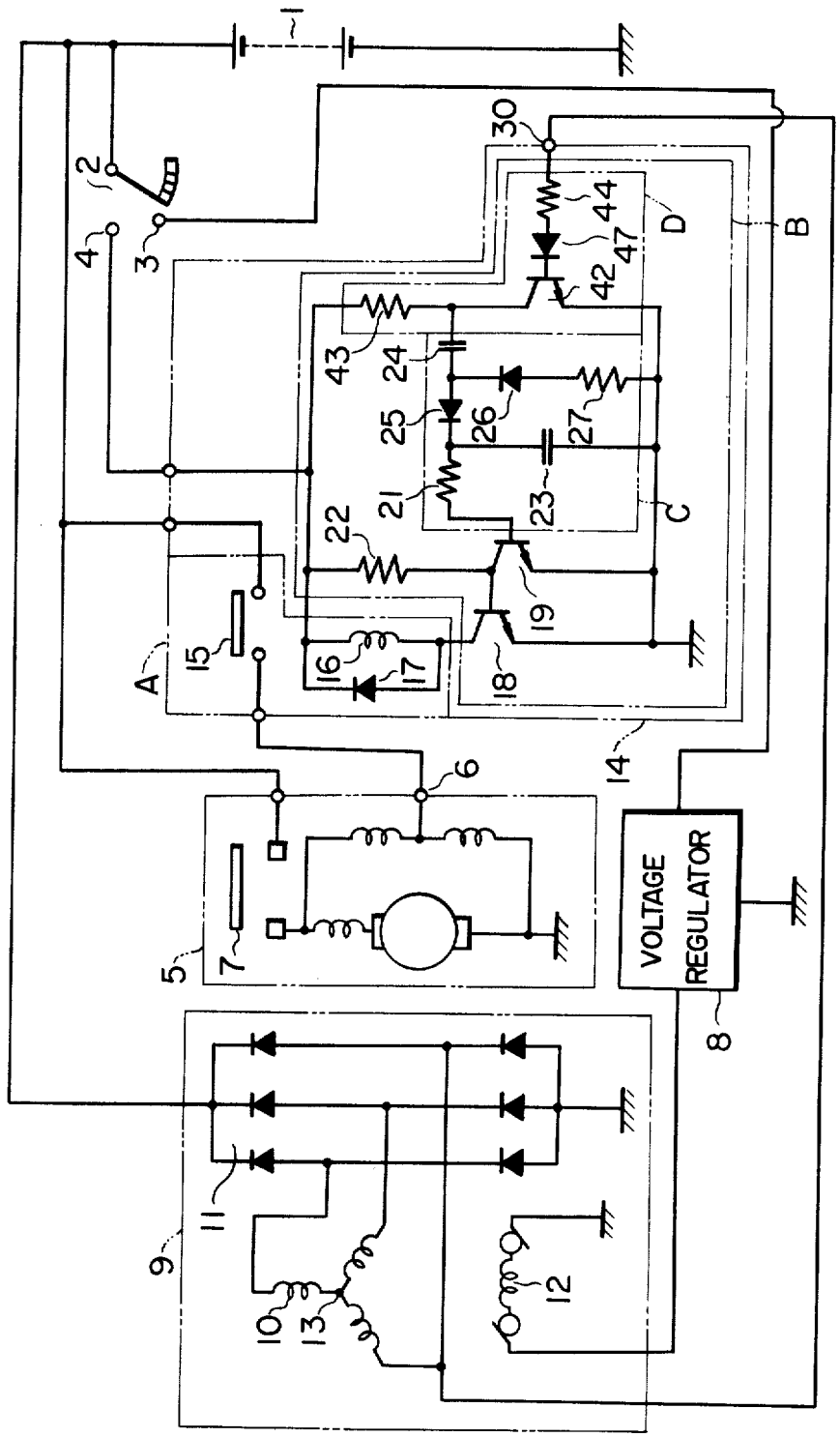
FIG. 8 is an electric circuit diagram showing the eighth embodiment of the present invention.

FIG. 8 shows the eighth embodiment of the present invention. The circuit construction of this embodiment is similar to the previously described embodiments, except that the frequency detecting circuit B further includes a pulse generator D comprising a transistor 42, a diode 47 and resistors 43 and 44 and adapted to detect the pulsating voltage of the AC generator 9 to generate a pulse voltage corresponding to the pulsating component.

With this arrangement, the operation of this embodiment is as follows. When the key switch 2 is thrown to the ignition switch 3 side, the exciting current flows into the field winding 12 of the generator 9 through the voltage regulator 8, thereby causing the generator 9 to stand by. Then, as the key switch 2 is also thrown to the starter switch 4 side so that the base current flows into the output stage transistor 18 through the resistor 22 and the transistor 18 is thus turned on, the coil 16 is energized closing the relay contacts 15 and thus supplying a current to the auxiliary terminal 6 of the starter 5. This causes the starter main contacts 7 to close, bringing the starter 5 into operation and thus starting the engine.

Figure 10:
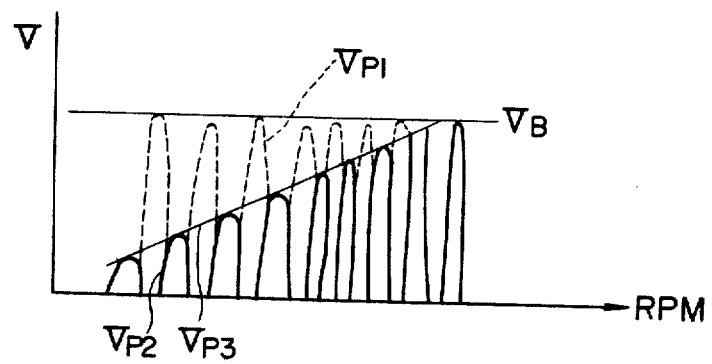
FIGS. 10 and 11 are waveform diagrams which are useful in explaining respectively the operation of the systems according to the eighth and ninth embodiments of this invention.

The operation of the eighth embodiment will be described in greater detail with reference to the waveform diagram of FIG. 10. When the engine comes into operation and thus the generator begins to operate, if the AC voltage of one phase generated in the generator 9 is a positive pulse, the voltage indicated by $V_{p2}$ in FIG. 10 is generated so that a current flows to the ground through the resistor 44, the diode 47 and the transistor 42. This turns on the transistor 42 causing the flow of current from the DC power supply 1 through the switch 4, the resistor 43 and the transistor 42. On the other hand, for the negative pulse voltage from the generator 9, the transistor 42 is turned off. In this way, the transistor 42 is turned on and off repeatedly in response to the positive and negative pulses of the AC voltage and the pulse voltage $V_{p1}$ amplified to the power supply voltage $V_B$ is converted into a DC form through a D-A converter C. Thus, when the frequency of the pulse voltage $V_{p1}$ amplified to the power supply voltage reaches a predetermined value, that is, when the vehicle AC generator comes up to a predetermined number of revolutions, the transistor 19 is turned on and therefore the transistor 18 is turned off. This allows the contacts 15 to open, interrupting the energizing circuit for the starter 5 and thus stopping the starter 5. As a result, the starter pinion is disengaged from the ring gear, thus preventing the starter 5 from being reversely operated by the engine.

Figure 9:
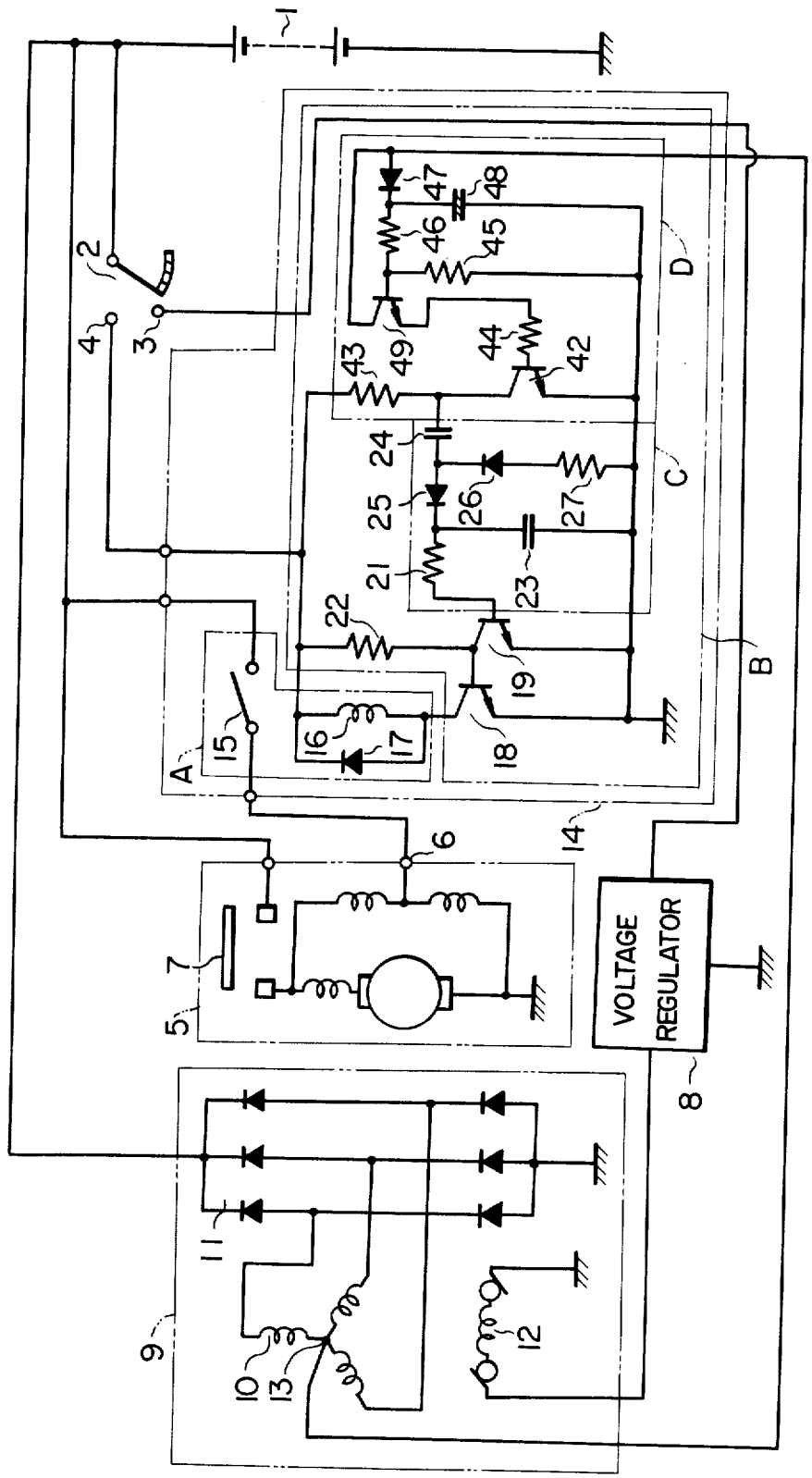
FIG. 9 is an electric circuit diagram showing the ninth embodiment of the present invention.

FIG. 9 shows the ninth embodiment of this invention. The circuit construction of this embodiment is identical with that of the eighth embodiment, except that the frequency detecting circuit B receives its input signal from the neutral point 13 of the vehicle AC generator 9 and that the pulse generator D of the frequency detecting circuit B comprises transistors 42 and 49, resistors 43, 44, 45 and 46, diode 47 and electrolytic capacitor 48.

Figure 11:
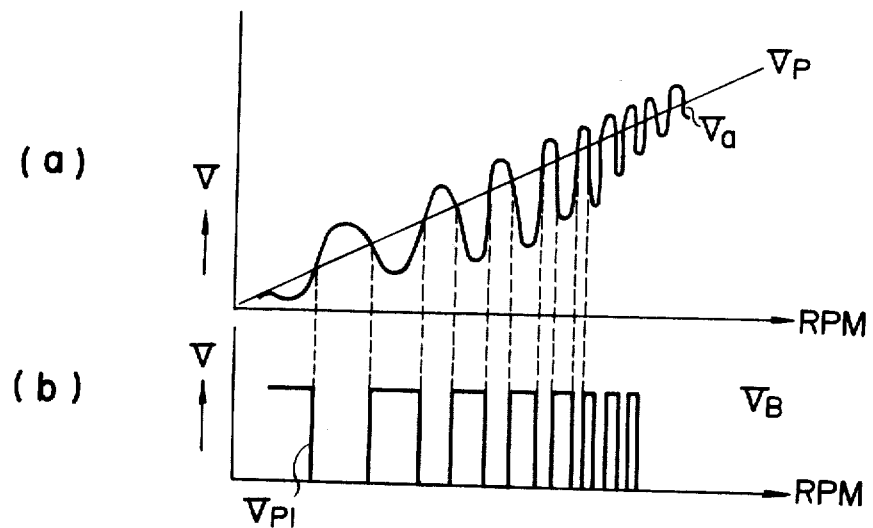

With this construction, the operation of the ninth embodiment will be explained with reference to FIG. 11. While the pulsating voltage generated at the neutral point 13 has the voltage waveform indicated by Va, the capacitor 48 charges only to the peak value (indicated by $V_p$) dropped through the diode 47. Consequently, when the pulsating voltage Va becomes higher than the value of $V_p$, the transistor 49 is turned on simultaneously turning on the transistor 42. The pulse voltage $V_{p1}$ thus amplified to the power supply voltage $V_B$ is applied to the D-A converter C. The rest of the operation of this embodiment is the same as that of the eighth embodiment.

In the eighth and ninth embodiments, the pulse generator is turned on and off in response to the pulsating voltage of the generated voltages of the vehicle AC generator to always apply the pulsating voltage of the power supply voltage level to the frequency detecting circuit through the diodes, resistors, etc., and thus there is the remarkable advantage of improving frequency accuracy of the D-A converter as well as improving the response characteristic to the engine revolutions.

I claim:

1. A vehicle starter protective system operative in combination with an AC generator in a vehicle comprising:
   a starter,
   a battery positioned in said vehicle,
   a key switch connected to said battery,
   a starter relay having a relay coil and relay contacts positioned between said starter and said key switch,
   a digital-to-analog converter means connected to said AC voltage generator for receiving the AC voltage generated by said AC generator for converting said AC voltage to a variable DC voltage,
   switching means including a first and second transistor connected in a Schmidt trigger configuration for operating said starter relay in accordance with the output of said digital-to-analog converter, wherein said digital-to-analog converter includes
   a capacitor charged in response to the voltage generated by said AC generator, said voltage having a frequency corresponding to the rotational rate of the rotor of said AC generator, and
   a resistor connected between said capacitor and the base terminal of said first transistor of said switching means, said capacitor and said resistor forming a delay means for maintaining the on-state of said first transistor for a fixed period of time after the rotational rate of said rotor falls below a predetermined level, and
   a pulse generator connected between said digital-to-analog converter and the neutral point of said AC generator, said pulse generator including a smoothing circuit for filtering the signal of said neutral point to derive the average value thereof, a third transistor coupled to the output of said smoothing circuit and controlled by the filtered voltage of said smoothing circuit, and a fourth transistor connected to said third transistor, said fourth transistor being connected to said delay circuit.

2. The vehicle starter protective system of claim 1 further comprising a delay circuit means including a capacitor connected to said battery through said key switch, and a circuit for applying the voltage of said capacitor to said switching means, wherein said switching means opens said starter relay for a predetermined period of time after said key switch is closed.

* * * * *